United States Patent [19]

Timmons et al.

[11] Patent Number: 4,822,630

[45] Date of Patent: Apr. 18, 1989

[54] PROCESSED EGG PRODUCT

[76] Inventors: Michael B. Timmons, 126 Sunset Dr., Ithaca, N.Y. 14850; Neal B. Kreher, 11066 Main St., Clarence, N.Y. 14031

[21] Appl. No.: 37,893

[22] Filed: Apr. 13, 1987

[51] Int. Cl.⁴ .......................... A23L 1/32; A23B 5/00
[52] U.S. Cl. ..................................... 426/614; 426/302
[58] Field of Search ................................ 426/614, 302

[56] References Cited

U.S. PATENT DOCUMENTS

| | | | |
|---|---|---|---|
| 1,842,733 | 1/1932 | Reynolds et al. | 426/614 |
| 1,989,359 | 1/1935 | Heuser | 426/324 |
| 2,421,199 | 7/1944 | Gutmann | 426/284 |
| 2,660,530 | 11/1953 | Adams | 426/299 |
| 3,113,872 | 12/1963 | Jones et al. | 426/511 |
| 3,207,609 | 9/1965 | Gorman et al. | 426/614 |
| 3,285,749 | 11/1966 | Shires | 426/490 |
| 3,385,712 | 5/1968 | Dodge et al. | 426/284 |
| 3,404,008 | 10/1968 | Ballas et al. | 426/568 |
| 3,493,393 | 2/1970 | Shires | 426/388 |
| 3,510,315 | 5/1970 | Hawley | 426/614 |
| 3,598,613 | 8/1971 | Hawley | 426/614 |
| 3,624,230 | 11/1971 | Robinson | 426/614 |
| 3,831,508 | 8/1974 | Wallard | 426/113 |
| 3,851,571 | 12/1974 | Nichols | 426/100 |
| 3,857,980 | 12/1974 | Johnson | 426/250 |
| 3,863,018 | 1/1975 | Shires | 426/388 |
| 4,161,548 | 7/1979 | Warren | 426/299 |
| 4,409,249 | 10/1983 | Forkner | 426/614 |
| 4,426,400 | 1/1984 | Newlin et al. | 426/614 |
| 4,433,001 | 2/1984 | Weimer et al. | 426/614 |
| 4,469,708 | 9/1984 | Rapp et al. | 426/103 |
| 4,524,082 | 6/1985 | Liot | 426/312 |
| 4,524,083 | 6/1985 | Liot | 426/330.1 |
| 4,537,788 | 8/1985 | Proctor et al. | 426/614 |

OTHER PUBLICATIONS

Timmons et al, New York State Dept. of Agriculture & Markets, Final Report, "Development of a Ready to Eat Deviled Egg Machine", Feb. 28, 1987.

Primary Examiner—Donald E. Czaja
Assistant Examiner—Helen Pratt

[57] ABSTRACT

Egg products, such as deviled eggs, are prepared by an easily automatable method starting with separate quantities of raw egg whites and egg yolks. The uncooked egg whites are mixed and evacuated to remove air and other gases, then dispensed into a multiplicity of open molds which preferably are of the size and shape of half an egg. Egg yolk filling is prepared from raw egg yolks which are cooked, chopped, and blended with seasonings. Most usually, a fraction of the total egg yolk filling is dispensed to float on the uncooked egg white in the molds. The egg white with egg yolk filling floating on top is cooked in steam and then a further amount of egg yolk filling is mounded on top to yield the desired egg product, e.g., a deviled egg. The cooking molds can be a portion of the final marketing package.

11 Claims, 2 Drawing Sheets

PROCESSED EGG PRODUCT

BACKGROUND OF THE INVENTION

The present invention relates, in general, to a process which may be utilized in the production of packaged egg products such as deviled eggs and the like.

The conventional method for producing deviled eggs is both time consuming and labor intensive. Additional problems include a large degree of variability in the finished product and excessive yield loss. The conventional method involves hard boiling the eggs in the shell, peeling the eggs, cutting the eggs in half, removing the yolks from the whites, mixing the yolks with appropriate seasonings, and dispensing the seasoned yolks back into the yolk cavity of the whites. The time, labor, and yield losses involved make deviled eggs relatively expensive.

It is therefore desirable to reduce the time, labor, and yield loss associated with the production of deviled eggs and similar products, while at the same time producing a more consistent product.

The desirability of a marketable deviled egg has already been recognized. Currently there are at least three major companies marketing such a product. All three use a similar process, which is comparable to the manner in which deviled eggs are made in the home, and hence distinctly different from the process of the invention. There are 3 major constraints to the current commercial method.

(1) Quality of the final product is limited by the quality of the starting shell egg (yields as low as 50% are currently being obtained in terms of obtaining a sufficiently high quality cooked white with proper location of the yolk).
(2) The preservative step (pickling) results in a lowered acceptability of the white texture, i.e., rubbery and tough.
(3) The process is labor intensive with no reasonable expectation of reducing this input.

The process of the invention eliminates all three of these constraints.

Newlin et al, U.S. Pat. No. 4,426,400 prepares deviled eggs by starting with a blended mixture of liquid egg whites, evacuating the mixture, dispensing the mixture into a multiplicity of open molds which are egg-shaped, positioning a second mold centrally in the first to form a yolk cavity in the egg white, cooking the egg white in steam, removing the cooked egg white from the mold, and dispensing into it a mixture of cooked egg yolk and seasoning. The problems with Newlin's method include the requirement of a second mold, removing the cooked egg white from the mold, and the deviled egg filling preparation procedure. These problems are explained below in detail.

The requirement of a second mold complicates the process making it more difficult to automate. A second mold would require means to introduce it into the pooled egg white and means to retract it from the cooked egg white.

Removing the cooked egg white from the mold is a step that involves the handling of a delicate material. The mechanism to perform this step must operate very gently to avoid damaging the cooked egg white. This step is difficult to automate and the mechanism to do so would be complex and expensive.

The yolk cooking procedure results in cooked yolks which are rubbery in texture. If this cooked yolk is then blended with seasonings, the resulting mixture contains rubbery pieces which result in an unsatisfactory texture.

BRIEF DESCRIPTION OF THE DRAWINGS

The present invention is illustrated in the attached drawings in which.

DESCRIPTION OF THE INVENTION

The process produces deviled eggs and similar products starting from separate quantities of raw egg white and egg yolk. Liquid egg white is filled into molds which are typically halfegg shaped, but which can be shaped as desired, and previously prepared egg yolk filling is floated on top of the egg white. This is then cooked and preferably a further amount of egg yolk filling is mounded on top to produce an attractive appearance. The egg yolk filling is produced from cooked egg yolk and most usually seasonings. In the process of the invention, if desired, the cooking mold serves a dual purpose as the final marketing package.

The processed egg product of the invention has the following advantages:

(1) Production by a process which can be automated.
(2) No handling or repackaging.
(3) Great flexibility in formulation.
(4) High yields.

The process produces a superior product in a manner which has distinct advantages over the conventional process.

Figure 1:
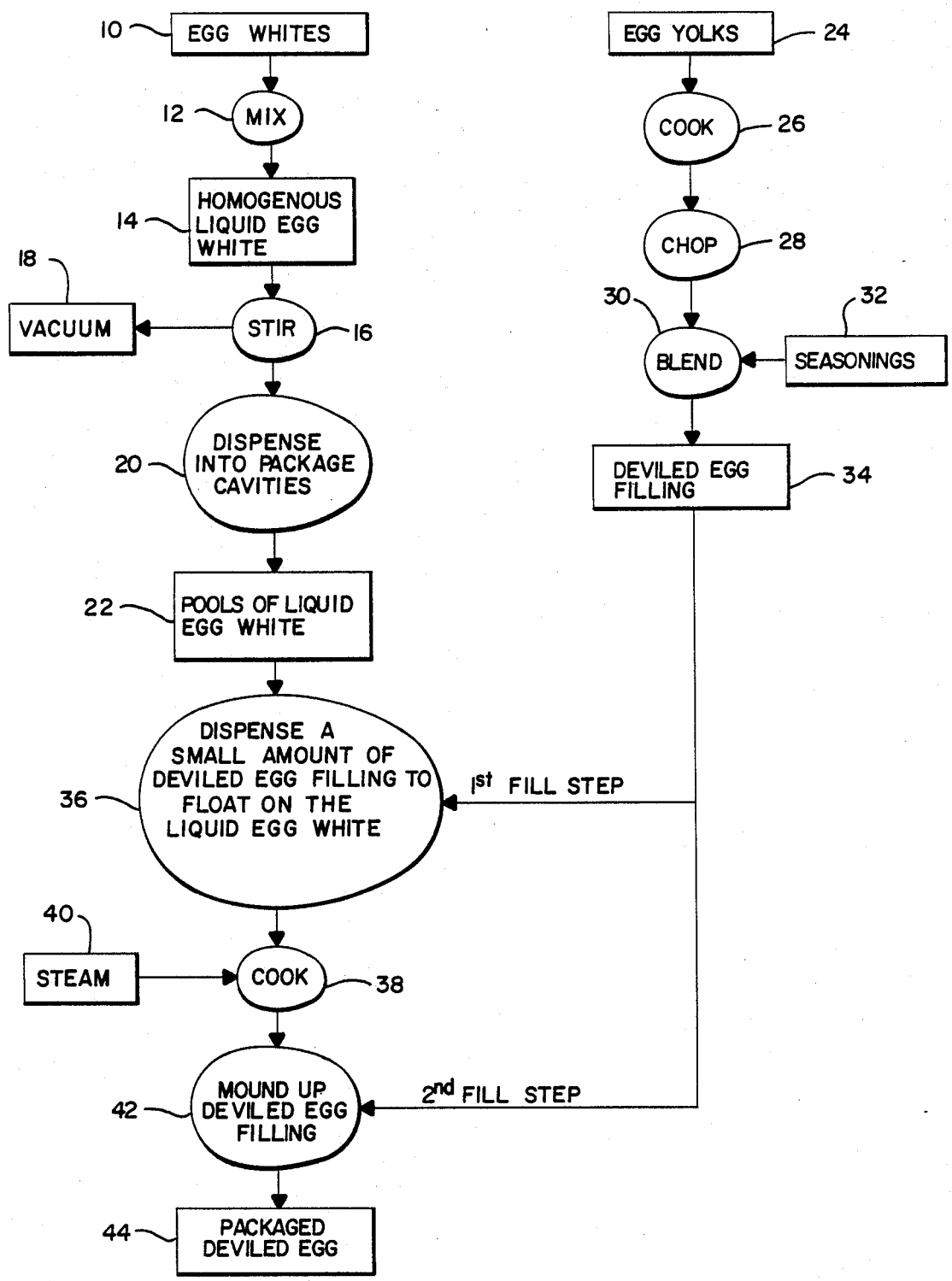
FIG. 1 is a process flow sheet illustrating a detailed form of the invention which begins with egg whites and egg yolks and ends with packaged deviled eggs.

A process flow sheet is illustrated in FIG. 1. Deviled eggs are produced by the following procedure: Raw egg whites are mixed vigorously in a blender to produce a homogenous liquid. The liquid egg white is deaerated by stirring under vacuum until dissolved and entrained air and other gases have been removed. The deaerated liquid egg white is dispensed into cavities in a plastic package (FIG. 2) which have the size and shape 216 of half an egg. A small amount (5 to 10 grams) of egg yolk filling (prepared as described below) is placed on each pool of egg white in the package. The package is placed in steam for approximately 5 minutes with reference to FIG. 3, after cooking, preferably a second amount of egg yolk filling 314 is mounded up on top of the first portion 312 to produce an attractive appearance. The cook-in-package tray is then sealed, completing the packaged deviled egg.

The egg yolk filling is produced as follows: Raw egg yolk is cooked to dryness. The cooked egg yolk is chopped, for example, in a food processor, until a homogenous pasty consistency is produced. Preferably, the processed cooked egg yolk is blended with seasonings to produce a flavored filling, for example, deviled egg filling.

DETAILS OF THE INVENTION

Raw egg whites in their native state are composed of both thin fluid (about 40%) and thick, viscous (about 60%) portions. This heterogenous mixture must be transformed into a homogenous liquid in order that the vacuum deaeration and liquid dispensing steps operate properly. A homogenous egg white liquid is produced by mixing the raw egg white vigorously, for example, in a blender. Alternatively, the raw egg white may be pumped through small (1 to 2 millimeter diameter) holes as in a baffle plate. A further alternative is to obtain liquid plain egg white which is already a homogenous liquid from a commercial egg breaker. If desired, any additional ingredients may be added to the liquid egg white before the deaeration step.

The deaeration setup typically consists of a vacuum source and the means to gently stir the egg white. Deaeration is important for a number of reasons. It is important to exclude oxygen, as its presence in the interior of the cooked product can accelerate deterioration. Vacuum deaeration may also remove objectionable volatile organic odors and flavors. Deaeration ensures a homogenous, single phase mixture which will cook evenly. If entrained or dissolved gases were to remain, bubbles could form upon cooking which would produce voids and impart an undesirable spongy texture to the product. In a typical operation, a vacuum of 50 to 100 mm mercury absolute pressure for 5 to 10 minutes is sufficient to adequately remove dissolved and entrained gases. After deaeration, usually the bubbles form a foamy layer (which must be removed) on the deaerated liquid egg white.

The deaerated homogenous liquid egg white is dispensed into the cooking mold, for example, the package cavities which impart the desired shape on the final cooked product. The package can also function as the final marketing package. This is referred to as a cook-in-package approach. It means that the product is cooked in the final marketing package. This technique is important to the process because it allows easy automation, provides for microbiological protection of the product, and reduces cost because of its simplicity.

Separately, but for example, at the same time as the preceding steps are occurring, the egg yolk filling, for example, a deviled egg filling can be produced from egg yolk and seasoning ingredients.

When egg yolk is cooked to dryness outside of the shell, (for instance, in a scraped surface steam jacketed kettle) the final texture is rubbery. This is very different from the crumbly texture of the yolk of a hardboiled egg. In the process of this invention, the rubbery texture of the cooked yolk is changed into the desired smooth, pasty consistency by finely comminuting the cooked yolk, for example, chopping in a food processor. This process preferably reduces the yolk to a particle size of about 0.1 to 0.2 mm diameter. The processed, cooked yolk is then blended with seasonings such as mayonnaise, vinegar, mustard, and worcestershire sauce to give the deviled egg filling. Obviously, other ingredients can be substituted or added to produce any desired flavor. The egg yolk filling may be whipped at this point to incorporate more air into it. In this way, its density may be manipulated so that it floats higher in the liquid egg white.

The small amount of egg yolk filling dispensed on top of the pools of liquid egg white floats there, substantially stationary. The submerged portion creates and occupies an indentation in the white of the cooked product which simulates the yolk cavity in a conventionally produced deviled egg. The creation of the yolk cavity by this floating portion is a step which eases the automation of the process.

The cooking step can be carried out by any acceptable food cooking means, for example, by culinary steam at atmospheric pressure. The steam condenses on the bottom surface of the package, transferring heat through the package to the product to cook it. Steam is also present at the top surface of the product. Here the steam acts to prevent the top surface of the egg white from drying out and forming a tough skin which would be objectionable to the consumer.

Figure 3:
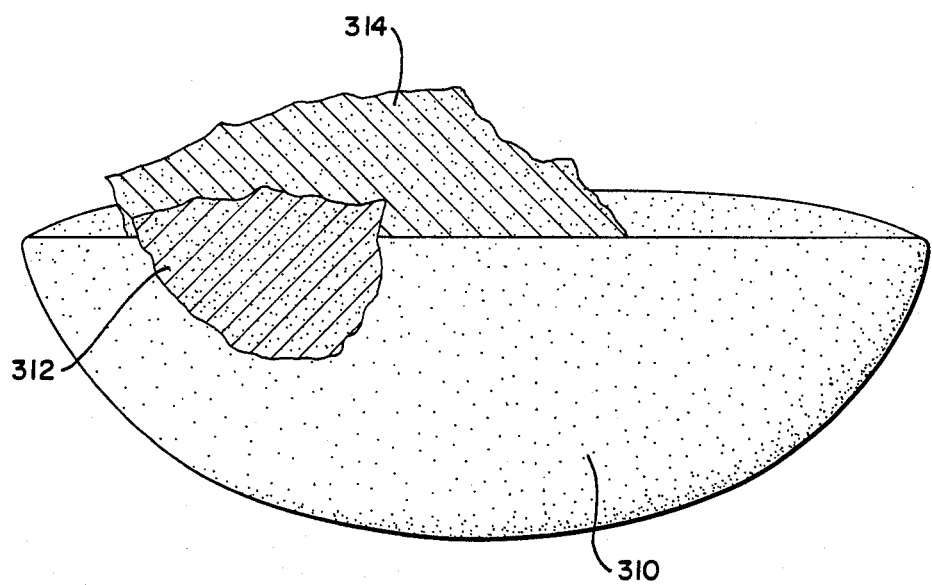
FIG. 3 is a cross sectional view of the deviled egg product of the invention illustrating the results of the two-step filling process.

At the completion of the cooking process, the product looks much like a conventionally produced deviled egg with a small amount of filling. In a usual, though optional, second fill step, additional filling is added at this point in the process to mound up on the cooked, solidified white and provide an attractive appearance. The package is then heat sealed to give a packaged deviled egg or similar product. The product appears identical to a conventionally made deviled egg. The only discernible difference is that the yolk cavity is not a perfect hemisphere; it may be somewhat irregularly shaped as can be seen in FIG. 3.

A preferred process step allows elimination of the second fill step with little loss of product appearance. This is accomplished by whipping a large amount of air into the deviled egg filling such that if floats very high in the liquid egg white. If it floats high enough, then a sufficient amount can be added in the first fill step so that a second fill step is not needed. This simplifies the process even further.

Microbiological control can be provided by a number of means but is preferably provided by the cooking processes. For example the egg white is cooked by 100° C. steam. The egg yolk filling is mixed up at high temperature and kept hot as both fill steps can be hot fill. Thus, all the processing can be done at temperatures which preclude bacterial survival. In that manner there is no chance of recontamination because the product is not handled after cooking as a conventionally made deviled egg is. These factors help to provide an extended shelf life. Further microbiological protection is provided by supplying filtered air at the critical package filling points. Additionally, ultraviolet lighting can be utilized for a surface sterilization immediately prior to the heat seal step.

Because this product is made in an unconventional way, it offers many benefits.

1. Ingredients can be added to the raw egg white before it is cooked.
2. Ingredients can be added to the raw yolk before it is cooked or to the cooked yolk.
3. The product can be made in a unique shape.
4. The product may be cooked by various methods.
5. The product need not be touched by human hands.

In a conventionally made deviled egg, ingredients can not be added to the raw egg white before cooking as it is sealed inside the shell. The process of the invention has no such restriction. If desired, for example, one may add ingredients to accomplish one or more functions.

1. Extend the products shelf life from a microbiological standpoint (e.g., by inhibiting bacterial growth).
2. Extend shelf life from a palatability standpoint (e.g., by preventing the product from becoming tough and rubbery, or too dry or soggy).
3. Add a desired and unique color or flavor.
4. Nutritionally fortify the product.

Similarly to the situation with egg white, it may be desirable to add ingredients to the yolk before it is cooked. These ingredients may perform similar functions to those listed for egg white ingredients. In addition, if desired, a synthetic yolk or reduced cholesterol yolk can be used to produce a low or no cholesterol filling.

The product can be made in a unique shape. This is not an option with the conventional method, which creates a product which can only be egg-shaped. In the process of the invention any shape may be created as desired by simply changing the shape of the mold e.g. package wells.

In the conventional approach, the only way to cook the eggs is in boiling water. In the process of the invention, steam or other means can be used to cook the egg white. Microwave cooking can also be employed.

The yolk can be cooked in several ways. For example, a first is in a scraped surface steam jacketed kettle. A second method is cooking in a boil-in-bag. Microwave cooking can also be employed.

The entire process of the invention is compatible with automation. For instance, the packaging approach described herein eliminates a significant amount of hand labor. All filling operations and all other steps can be performed by commercially available equipment which can be integrated into a single automated production line.

PACKAGING

In a preferred embodiment, a plastic package serves as both the cooking mold and the final marketing package. This approach eliminates the need for the egg product manufacturer to handle the fragile cooked egg white. The processed egg product of the invention is handled only when the final consumer removes it from the package.

The package serves as a cooking mold when it is filled with raw egg white and imparts the desired egg shape on the product through the cooking process. This is the same function that the shell serves in the conventional process.

The package serves as the final marketing package. At the end of the egg product production process, the package is sealed and then enters the distribution system for eventual sale to the ultimate consumer. The consumer removes the egg product from the package by pushing up on the bottom of the package. This forces the deviled egg up so that it may be grasped firmly from the sides and picked up.

In the same way that a cooked egg must be peelable if it is to make an attractive deviled egg, the cooking mold must release the cooked egg white and must not adhere to it. Release of the egg product of the invention from the package can be attained. A first is to formulate the egg white and choose the plastic out of which the package is made in such a way that there is no adhesion between the two surfaces after cooking is complete. A second method is to use a release agent to keep the two surfaces separate in the first place.

It was found that the polymer polyvinylidene chloride, PVDC (Dow's Saran Wrap) had the desired release characteristics. It does not adhere to fresh egg white that is cooked in contact with it.

It is presently preferred to use a release agent in the process. The presently preferred release agent is a vegetable oil (for example PAM Vegetable Cooking Spray). It creates a thin film on the package which prevents the egg white from sticking to the plastic and allows the product to be easily removed.

The technique of using a release agent means that plastic to egg white adhesion is not a relevant factor in choosing a plastic. Thus, many more plastics are suitable for consideration as a packaging material. This offers greater opportunity for minimizing packaging costs.

The material used in the package must also withstand the cooking process without undergoing undesirable chemical or physical changes. It must not char or distort. It must support its own weight and the weight of the egg ingredients. The plastic package must have a food contact surface (i.e., the egg-shaped cavities) which are made of a material approved for food packaging use. Allowed materials are listed in the Code of Federal Regulations, Title 21.

Additionally, preferably the material should be heat sealable, so that a barrier film can be heat sealed to the package to produce an aseptic product.

These requirements may be satisfied by either a single material or a composite structure. HDPE is a suitable material. A laminate of PVDC on nylon may also be suitable.

The presently preferred package has a number of egg-shaped and sized depressions or wells. The package is shaped such that it has a surface which can be heat sealed. Additionally, the package is stackable. Preferably the package must be thick enough to provide the necessary structural integrity during cooking and distribution; yet must be thin enough that the wells can be easily pushed up from the bottom to remove the product.

A prototype package figure has been developed. It is a bilevel tray made of 24 mil food grade HDPE with a skirt and a number of egg-shaped depressions. The tray has stacking lugs formed into it. In one orientation the trays nest with one another in a very compact manner. If they are turned 180° however, the stacking lugs no longer line up on one another and the trays stack, providing enough space for the deviled egg product without crushing it. The package has 12 egg-shaped wells in it arranged as a 3×4 matrix. The wells are slightly deeper than half an egg so that at the end of the process, the top surface of the cooked egg white is slightly recessed. The package has an elevated sealing surface. This elevation allows space for the deviled egg filling to be mounded up on the egg white and still remain below the top barrier film.

DESCRIPTION OF PREFERRED EMBODIMENTS

The process of FIG. 1 begins with separated egg whites 10 and egg yolks 24 obtained in a known manner from eggs of breaker quality.

Egg whites 10 are mixed 12 vigorously to transform the heterogenous mixture 10 into homogenous liquid egg white 14. The homogenous liquid egg white 14 is stirred 16 in a vessel to which vacuum 18 is applied to remove dissolved and entrained air and other gases. The homogenous degassed liquid egg white is dispensed 20 into package cavities, for example as illustrated in FIG. 19, to give pools of liquid egg white 22.

In a separate operation, egg yolks 24 are cooked 26 until dry, chopped 28 until smooth and pasty, and blended 30 with seasonings 32 such as mayonnaise, vinegar, mustard, and worcestershire sauce to yield deviled egg filling 34. A small amount of deviled egg filling 34 is dispensed 36 onto each pool of liquid egg white 22 in the package cavities. The packaged pools of liquid egg white 22 with a small amount of deviled egg filling floating on top of each is then cooked 38 by steam 40 and then more deviled egg filling 34 is mounded on top 42 to give the resulting packaged deviled egg 44.

Figure 2:
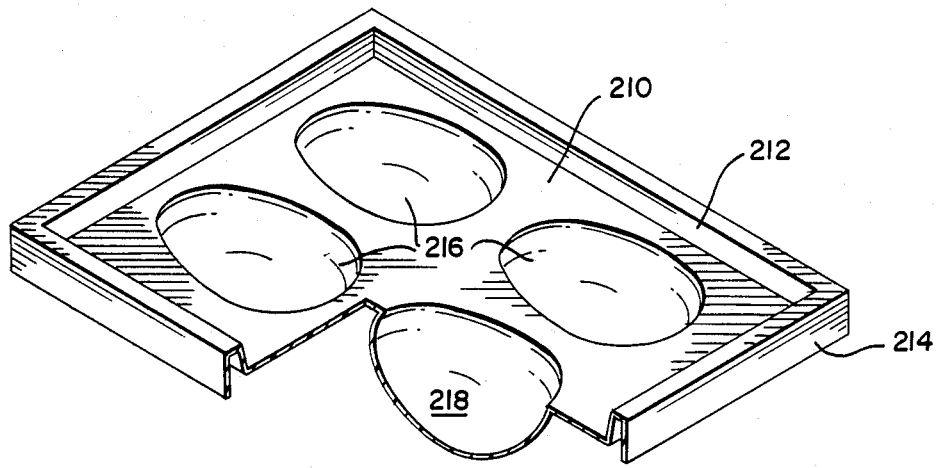
FIG. 2 is a package suitable for use with the present invention.

A package which is suitable for use in the present invention is illustrated in FIG. 2. The package is a bi-level tray, the two levels being the lower level 210 and the upper level 212. The tray has a skirt 214 which provides support to the package. The lower level 210 of the tray has a number of egg-shaped depressions 216 with one depression 218 being shown in a cutaway view. The dispensing operation 20 produces pools of liquid egg white 22 in the cavities 216 and 218. The package then serves as a mold for the cooking process 38 and finally serves as the end package for the deviled egg 44. To seal the package a film may be heat sealed to the upper level 212 of the tray in a known manner.

The product which is a result of the present invention is shown by FIG. 3 which is a cross section of a typical deviled egg showing the cooked egg white 310 with an amount of deviled egg filling 312 intruding into the cooked egg white 310 and a further amount of deviled egg filling 314 mounded up on top. This is similar to a conventionally made deviled egg differing only in that the intrusion of deviled egg filling 312 into the cooked egg white 310 is not perfectly hemispherical but rather is somewhat irregular.

What is claimed is:

1. A method for the production of an egg product which comprises the steps of:
   (a) dispensing liquid egg white into a mold;
   (b) dispensing a predetermined amount of filling comprising cooked particulate egg yolk to float partially submerged in a substantially stationary position in said liquid egg white;
   (c) cooking the egg white until solidified; thereby forming an egg product having a central yolk portion with its submerged portion surrounded by the cooked egg white portion while its exposed upper portion resembles a deviled egg filling.

2. The method as in claim 1 where the filling comprises seasoned particulate egg yolk.

3. The method as in claim 1 where a second predetermined amount of filling is placed upon the first portion after the egg white has been solidified.

4. The method of as in claim 1 where the filling comprising cooked particulate egg yolk is whipped with air to cause it to float higher in the liquid egg yolk.

5. A method for the production of egg products which comprises the steps of mixing, deaerating, and dispensing into molds liquid egg white, separately cooking, chopping, and seasoning egg yolks, dispensing an amount of the seasoned, cooked egg yolk to float partially submerged on the pools of liquid egg white in the molds, cooking the liquid egg white and dispensing a further amount of seasoned, cooked egg white and dispensing a further amount of seasoned, cooked egg yolk on top of the first portion to provide an egg product where the yolk portion resembles a deviled egg filling.

6. The method of claim 5 where a yolk shaped intrusion into the egg white is produced by floating an amount of deviled egg filling on the liquid egg white and then cooking the liquid egg white.

7. The method of claim 5 where the cooking mold is a portion of the final marketing package.

8. The method of claim 5 where the liquid egg yolk is cooked to dryness and finely chopped to produce a smooth, pasty consistency.

9. The method of claim 5 where during mixing the egg whites are reduced to a homogenous liquid by mixing them vigorously.

10. The method of claim 5 where during mixing the egg whites are reduced to a homogenous liquid by pumping them through small diameter holes.

11. The method of claim 5 where a light film of vegetable oil is applied to the mold to aid in removal of the product therefrom.

* * * * *